United States Patent [19]

Huang

[11] Patent Number: 5,286,134
[45] Date of Patent: Feb. 15, 1994

[54] DEVICE FOR SUPPORTING CANOPY CLOTH

[76] Inventor: Ming-Tai Huang, 4 Fl., No. 302, Pai Ling Wu Rd., Taipei, Taiwan

[21] Appl. No.: 993,048

[22] Filed: Dec. 18, 1992

[51] Int. Cl.⁵ .......................... B62B 9/14; B62B 3/10; E04H 15/06; F16B 2/20
[52] U.S. Cl. .................... 403/389; 403/397; 403/399; 24/339; 24/458; 135/88; 135/90; 280/643
[58] Field of Search .................... 280/642, 643, 30, 42; 135/90, 88, 96, 112; 403/397, 391, 399, 389, 71; 24/339, 458

[56] References Cited

U.S. PATENT DOCUMENTS

| | | | |
|---|---|---|---|
| 3,017,600 | 1/1962 | Husted | 403/391 X |
| 4,688,961 | 8/1987 | Shioda et al. | 403/389 |
| 4,900,184 | 2/1990 | Cleveland | 403/399 X |

Primary Examiner—Randolph A. Reese
Assistant Examiner—Christopher J. Novosad
Attorney, Agent, or Firm—Gunn, Lee & Miller

[57] ABSTRACT

A device for supporting a canopy. The device comprises (a) two joints each comprising (1) a clamp for connecting with a corresponding handle support of a baby stroller and comprising a first finger and a second finger comprising an upper recess and a lower recess and (b) a strip connecting with the second finger and comprising an upper recess and a lower recess and (b) two canopy shelves each comprising (1) a first member for supporting the canopy and (2) a second member connecting with the long member at an angle and comprising two sides respectively comprising two protrusions. The second member of the canopy shelf can be moved past the strip so that the protrusions engage in the recesses and so that the canopy shelf is retained in an upper position for shielding occupants. The clamp also has a protrusion projecting therefrom between the fingers and penetrating the handle support, for restraining the device from rotating about and sliding along the handle supports.

3 Claims, 4 Drawing Sheets

DEVICE FOR SUPPORTING CANOPY CLOTH

BACKGROUND OF INVENTION

1. Field of Invention

The present invention relates to baby strollers and, more particularly, to a device for supporting a canopy for such baby strollers and, still more particularly, to a canopy shelf and a joint for mounting such a canopy shelf on such baby strollers.

2. Related Prior Art

Co-pending U.S. patent application Ser. No. 07/906,688, now abandoned, of the same applicant of the present invention teaches a joint for connecting a canopy shelf with a handle support of a baby stroller. Some references have been mentioned in the co-pending U.S. patent application and, therefore, will not be described hereinafter. However, a specific conventional device 60 for supporting a canopy will be illustrated with reference with FIG. 6. The device 60 has two canopy shelves 61 respectively having a first end inserted through a passage formed in a corresponding handle support of a baby stroller. The device 60 also has two bolts 62 respectively having a first end inserted through a passage formed in a corresponding handle support of the baby stroller. As shown in bold lines, the canopy shelf 61 is sited, near its first end, against the bolt 62, so that the canopy shelf 61 is in an upper position for shielding occupants. As shown in phantom lines, the canopy shelf 61 can be pivoted to a lower position for storing.

SUMMARY OF INVENTION

It is an object of the present invention to provide a canopy shelf for a baby stroller.

It is another object of the present invention to provide a joint for linking a canopy shelf to a handle support of a baby stroller.

For a better understanding of the present invention and objects thereof, a study of the detailed description of the embodiments described hereinafter should be made in relation to the accompanying drawings.

DETAILED DESCRIPTION OF PREFERRED EMBODIMENT

In accordance with a preferred embodiment of the present invention, a device for attaching a canopy shelf to a handle support of a baby stroller will be described in details with reference to the drawings.

Figure 1:
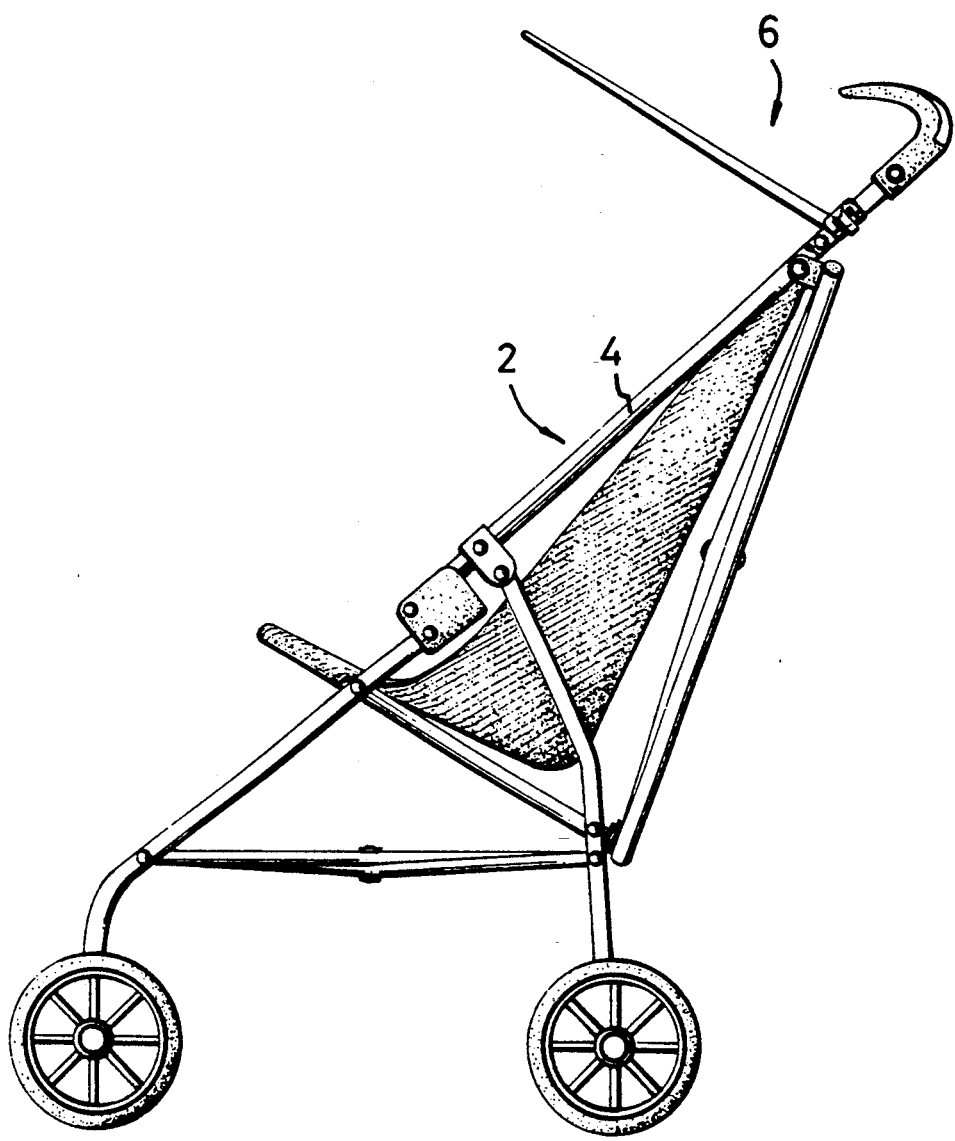
FIG. 1 is a right side view of a baby stroller using a device for attaching a canopy shelf to a handle support thereof in accordance with the preferred embodiment of the present invention.

Initially referring to FIG. 1, a conventional baby stroller 2 has two handle supports 4 (only one is shown) equipped with a device 6 supporting a canopy.

Figure 2:
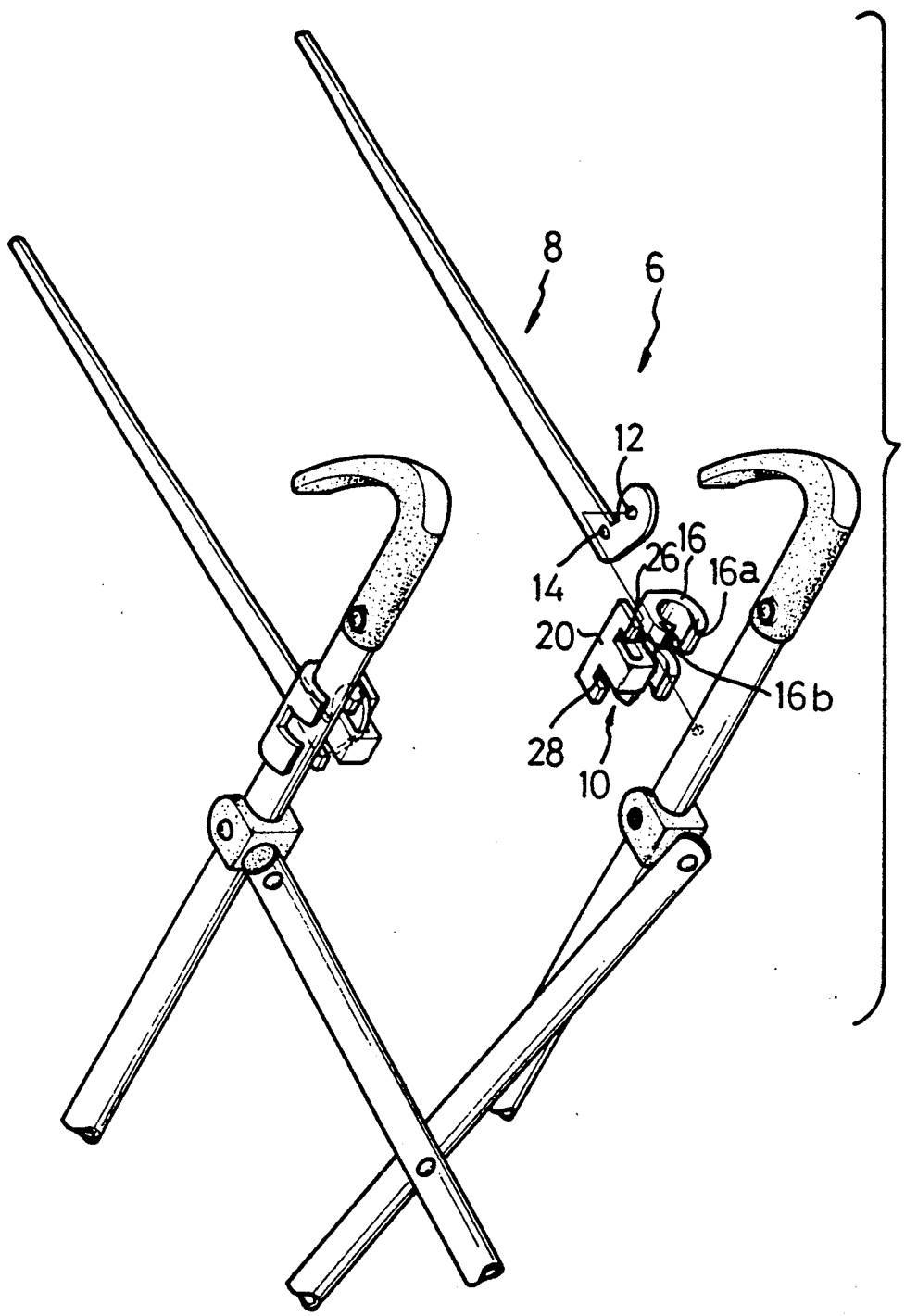
FIG. 2 is a rear-right-top perspective view of a device for attaching a canopy shelf to a handle support of a baby stroller in accordance with the preferred embodiment of the present invention.

Additionally referring to FIG. 2, the device 6 has two canopy shelves 8 and two joints 10. The canopy shelves 8 are linked to the handle supports 4 by means of the joints 10. The joints 10 are made of elastic materials.

The canopy shelf 8 is substantially a strip having a long member connecting with a short member at about 90°. The long member supports a canopy. The short member has two first protrusions 12 laterally projecting from two opposite sides thereof and two second protrusions 14 laterally projecting from the two opposite sides thereof. Preferably, the first protrusions 12 are longer than the second protrusions 14.

The joint 10 has a cylindrical clamp 16 for connecting with the handle support 4 The clamp 16 consists of two fingers 16a and 16b. The clamp 16 has a protrusion 18 (see FIGS. 4 and 5) projecting from a point thereof, between the fingers 16a and 16b. The protrusion 18 engages in a hole defined in the handle support 4 for restraining the device 6 from rotating about and sliding along the handle support 4 (see FIGS. 4 and 5).

Figure 4:
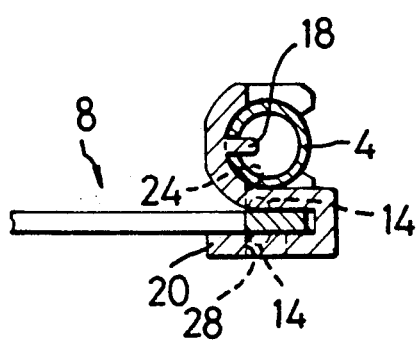
FIG. 4 is a cross-sectional view of a device for attaching a canopy shelf to a handle support of a baby stroller in accordance with the preferred embodiment of the present invention, taken along a line 4—4 in FIG. 3.
Figure 6:
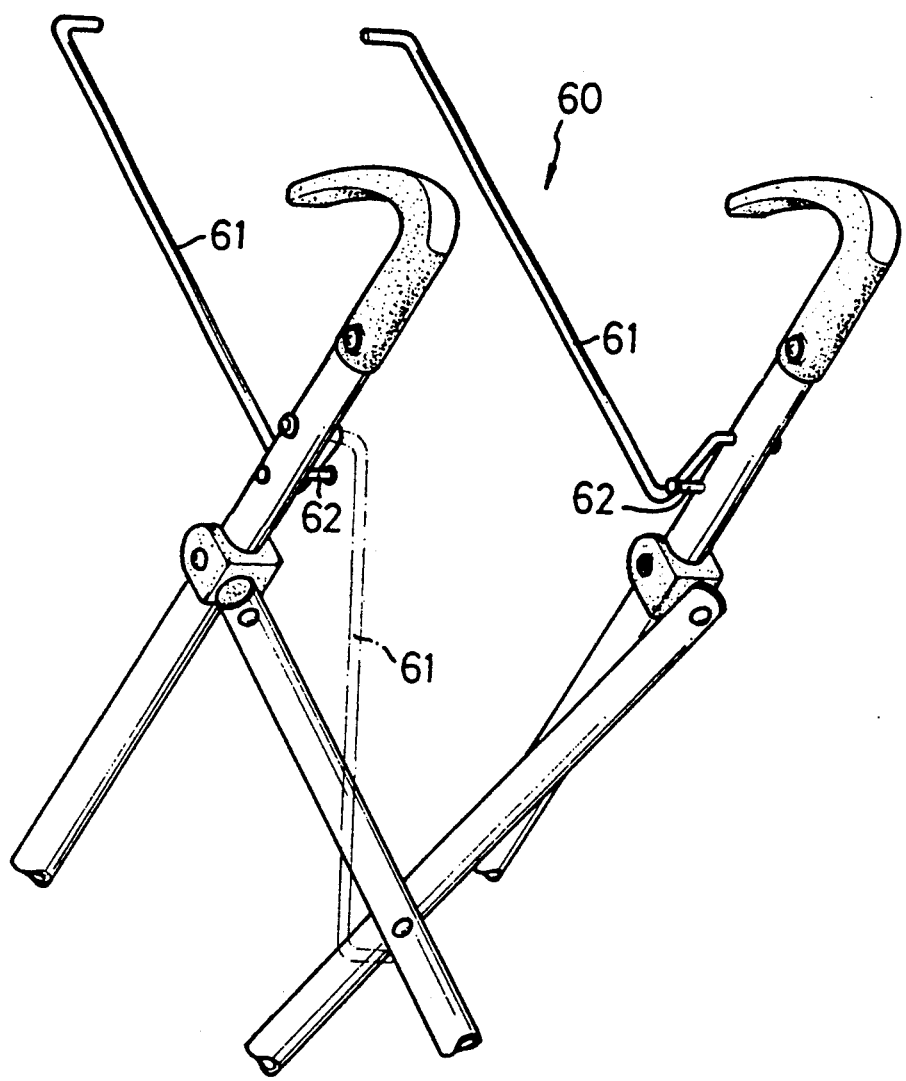
FIG. 6 is a rear-right-top perspective view of a device for attaching a canopy shelf to a handle support of a baby stroller in accordance with prior art.

The joint 10 further has a strip 20 formed beside the finger 16b, so that the joint 10 substantially has an S-shaped configuration (see FIG. 4). Two recesses 22 and 24 are formed in the finger 16b, respectively for engaging with the protrusions 12 and 14. Two recesses 26 and 28 are formed in the strip 20, respectively for engaging with the protrusions 12 and 14.

Figure 3:
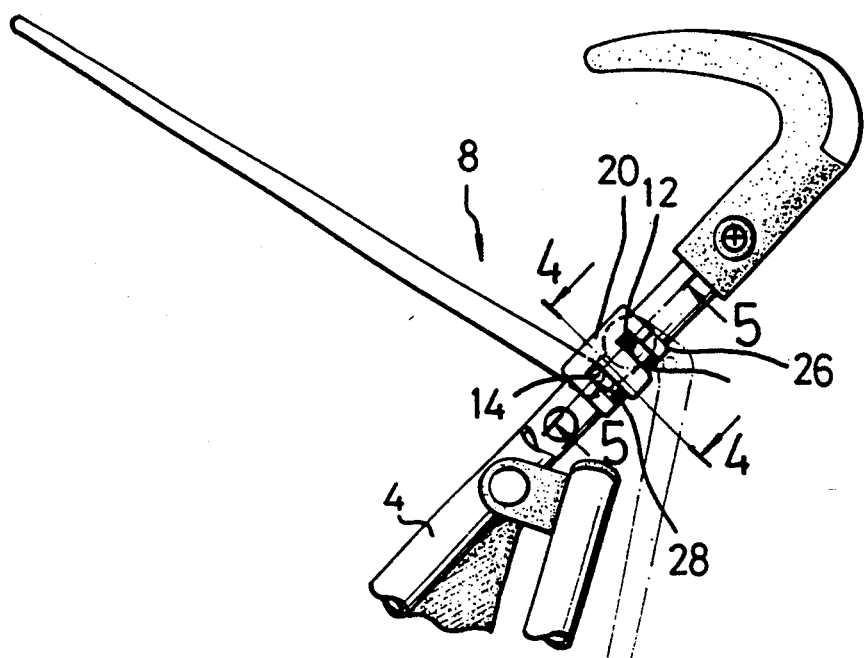
FIG. 3 is an enlarged right side view of a device for attaching a canopy shelf to a handle support of a baby stroller in accordance with the preferred embodiment of the present invention.
Figure 5:
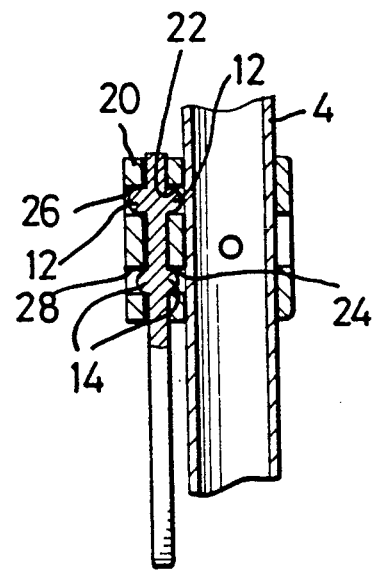
FIG. 5 is a cross-sectional view of a device for attaching a canopy shelf to a handle support of a baby stroller in accordance with the preferred embodiment of the present invention, taken along a line 5—5 in FIG. 3.

The short member of the canopy shelf 8 is pushed past the strip 20 into a space between the finger 16b and the strip 20, so that the first protrusions 12 engage in the recesses 22 and 26, and the second protrusions 14 engage in the recesses 24 and 28, as shown in bold lines in FIG. 3 with additional reference to FIGS. 4 and 5. The canopy shelf 8 is retained in an upper position for shielding occupants when sitting in the baby stroller 2.

The second protrusions 14 are pushed past the strip 20 so as to disengage from the recesses 24 and 28 while the first protrusions 12 engage in the recesses 22 and 26, as shown in phantom lines in FIG. 3. The canopy shelf 8 is retained in a lower position for storage.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A device for supporting a canopy, comprising:
   two joints each comprising (a) a clamp for connecting with a corresponding handle support of a baby stroller and comprising a first finger and a second finger comprising an upper recess and a lower recess and (b) a strip connecting with said second finger and comprising an upper recess and a lower recess; and
   two canopy shelves each comprising (a) a first member for supporting the canopy and (b) a second member connecting with a long member at an angle and comprising two sides respectively comprising two protrusions;

said second member of a canopy shelf being movable past said strip so that said protrusions engage with said recesses and so that said canopy shelf is retained in an upper position for shielding occupants.

2. A device in accordance with claim 1, wherein said clamp further has a protrusion projecting therefrom between said fingers and penetrating the handle support, for restraining said device from rotating about and sliding along the handle supports.

3. A device in accordance with claim 1, wherein said protrusions formed on a short member comprises two first protrusions for engaging in said upper recesses and two second protrusions for engaging in said lower recesses, said first protrusions are longer than said second protrusions.

* * * * *